(12) United States Patent
Herrala et al.

(10) Patent No.: US 10,557,531 B2
(45) Date of Patent: Feb. 11, 2020

(54) IDLER ASSEMBLY

(71) Applicant: GM Global Technology Operations LLC, Detroit, MI (US)

(72) Inventors: Kevin W. Herrala, Grand Blanc, MI (US); Eric D. Staley, Flushing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 15/196,532

(22) Filed: Jun. 29, 2016

(65) Prior Publication Data

US 2018/0003272 A1    Jan. 4, 2018

(51) Int. Cl.
*F16H 7/12* (2006.01)
*F16H 7/08* (2006.01)

(52) U.S. Cl.
CPC ............ *F16H 7/1281* (2013.01); *F16H 7/08* (2013.01); *F16H 2007/081* (2013.01); *F16H 2007/0842* (2013.01); *F16H 2007/0865* (2013.01); *F16H 2007/0893* (2013.01)

(58) Field of Classification Search
CPC ............ F02B 67/06; F16H 2007/0874; Y10S 474/90; F01L 1/024; F01L 1/348
USPC ........................................................ 474/128
See application file for complete search history.

(56) References Cited

U.S. PATENT DOCUMENTS

| | | | | |
|---|---|---|---|---|
| 932,000 A * | 8/1909 | Cressman | ............. | F16H 7/0827 474/119 |
| 1,430,716 A * | 10/1922 | Anderson | ................. | F16H 7/02 474/117 |
| 1,835,617 A * | 12/1931 | Stewart | ................. | F16H 7/1281 57/99 |
| 2,195,229 A * | 3/1940 | Smart | ....................... | F16H 7/02 474/119 |
| 2,210,276 A * | 8/1940 | Bremer | ................. | F16H 7/0848 474/110 |
| 2,504,624 A * | 4/1950 | Barnes | ...................... | F16H 7/22 474/109 |
| 3,479,894 A * | 11/1969 | Cofer | .................... | F16H 7/1281 474/135 |
| 3,825,209 A * | 7/1974 | Mikkelsen | ............. | G11B 15/28 242/356.3 |

(Continued)

FOREIGN PATENT DOCUMENTS

JP     2008175258 A     7/2008

OTHER PUBLICATIONS

Chinese Office Action for Application No. 201710451327.4 dated May 7, 2019; 7 pages.

*Primary Examiner* — Henry Y Liu
(74) *Attorney, Agent, or Firm* — Cantor Colburn LLP

(57) ABSTRACT

An idler assembly includes a cam, an idler pulley, a baseplate, an idler pulley bracket, and a belt. The cam is pivotally mounted to an idler pulley bracket, the cam may pivot between a first position and a second position via a first pivot. The idler pulley is mounted to a baseplate. The baseplate is pivotally mounted to an idler pulley bracket. The baseplate may therefore pivot between a first position and a second position relative to the idler pulley bracket. The belt may be easily mounted on the idler pulley when the baseplate and cam are in the second position. The belt is in tension when the baseplate and cam are moved from the second position to the first position.

5 Claims, 6 Drawing Sheets

(56) References Cited

U.S. PATENT DOCUMENTS

| | | | | |
|---|---|---|---|---|
| 4,036,070 A * | 7/1977 | Knight | F16H 7/0827 | 474/119 |
| 4,474,562 A * | 10/1984 | Heurich | F16H 7/1281 | 29/517 |
| 4,525,151 A * | 6/1985 | Tomita | F16H 7/1281 | 123/90.15 |
| 4,713,045 A * | 12/1987 | Kodama | F16H 7/1281 | 474/135 |
| 4,842,570 A * | 6/1989 | Niebling | F16H 7/1281 | 474/118 |
| 4,878,461 A * | 11/1989 | Sapienza, IV | F01L 1/02 | 123/90.15 |
| 5,065,709 A * | 11/1991 | Ito | F01L 1/02 | 123/90.15 |
| 5,304,100 A * | 4/1994 | Awasaka | F16H 7/1281 | 474/135 |
| 5,518,459 A * | 5/1996 | Sakai | F16H 7/1227 | 474/133 |
| 5,533,585 A * | 7/1996 | Kawano | B62M 27/02 | 180/190 |
| 6,312,352 B1 * | 11/2001 | Holland | A01D 34/76 | 474/113 |
| 6,312,353 B1 * | 11/2001 | Oba | F16H 7/18 | 474/111 |
| 6,361,459 B1 * | 3/2002 | Serkh | F16F 7/08 | 474/109 |
| 7,101,295 B2 * | 9/2006 | Taomo | B23D 47/12 | 474/117 |
| 7,552,708 B2 * | 6/2009 | Serkh | F01L 1/024 | 123/198 R |
| 7,815,533 B2 * | 10/2010 | Vrsek | F01L 1/348 | 474/109 |
| 7,901,309 B2 * | 3/2011 | Lehtovaara | F16H 7/08 | 474/109 |
| 8,083,623 B2 * | 12/2011 | Cantatore | F16H 7/08 | 474/109 |
| 8,840,495 B2 * | 9/2014 | Comsa | F01L 1/02 | 474/110 |
| 8,888,625 B2 * | 11/2014 | Lehman | A01D 45/023 | 474/117 |
| 9,464,697 B2 * | 10/2016 | Antchak | F02B 67/06 | |
| 9,861,039 B2 * | 1/2018 | Jiang | A01D 69/08 | |
| 9,869,379 B2 * | 1/2018 | Frankowski | F16H 7/0831 | |
| 9,939,052 B2 * | 4/2018 | Bailliu | A01F 12/56 | |
| 10,054,199 B2 * | 8/2018 | Newman | F16H 7/1281 | |
| 2004/0033852 A1 * | 2/2004 | Taomo | B23D 47/12 | 474/101 |
| 2004/0053719 A1 * | 3/2004 | Gibson | F16H 7/1281 | 474/112 |
| 2011/0312454 A1 * | 12/2011 | Comsa | F01L 1/02 | 474/110 |
| 2013/0095966 A1 * | 4/2013 | Staley | F16H 7/1218 | 474/135 |

* cited by examiner

IDLER ASSEMBLY

TECHNICAL FIELD

The present disclosure concerns engine components, and more particularly, the serpentine belt and pulley system of an engine.

INTRODUCTION

In automotive industries, belts are used to drive various components of a vehicle. Examples of such components include power steering, alternator, water pump, AC compressor and the like. Typically, the belts transfer power from an engine of the vehicle to these components for driving them. These days, instead of employing belts individually for each of the components, a single belt is employed for driving all such components in the vehicle. Such a belt, conventionally known as a serpentine belt, routes around various drive and idler pulleys associated with various components of the vehicle.

With consistent use thereof, the serpentine belt (hereinafter referred to as "belt") undergoes wear and tear over a period of time. Consequently, the belt may slip from one or more of the pulleys and/or idlers associated with the various components of the vehicle. Slipping between the belt and pulleys/idlers leads to increase in load on the engine, more power consumption or failure in the power transmission to the components of the vehicle. Accordingly, the belt requires maintenance or replacement from time to time. During replacement or maintenance thereof, the belt may be installed, removed, routed or adjusted on/from the pulleys and gears.

While installing, removing, routing, or adjusting the belt, it is required to handle the belt carefully due to various reasons. One of the reasons is availability of very less clearance while accessing the pulleys and idlers of the engine under a hood of the vehicle. Due to this, it may be difficult to reach the belt for handling it.

Typically, a front-wheel-drive vehicle with a transversely mounted engine provides limited access to the belt, thereby necessitating lifting of the front wheel of the vehicle from the ground for accessing the belt. Further, in some vehicles, a splash shield needs to be removed for accessing the front portion of the engine for handling the belt. Such an activity of removing the splash shield for accessing of the belt is cumbersome for an individual handling the belt. Furthermore, in some other cases, handling of the belt is much more difficult when the engine is hot. Due to these above mentioned reasons, just accessing the belt can be a time consuming and unpleasant experience for any individual such as an automotive specialist.

Currently, a rod or a screwdriver may be used to adjust the belt on the pulley. However, the belt may be slipped off from the rod or the screwdriver while being adjusted. This may require additional effort to first adjust the belt on the rod or the screwdriver and thereafter, to adjust the belt on the pulleys and/or idlers. Accordingly, handling the belt by using the rod or the screwdriver may be time consuming and tiresome for an individual handling the belt.

SUMMARY OF THE INVENTION

The present disclosure provides an idler assembly and method for easily installing a belt onto an idler and drive pulley system of an engine where the packaging space is very limited.

The idler assembly includes a cam, an idler pulley, a baseplate, an idler pulley bracket, and a belt. The cam is pivotally mounted to an idler pulley bracket, the cam may pivot between a first position and a second position via a first pivot. The first pivot may include a force balancing biasing means to urge the cam to rotate in a clockwise direction. The biasing means for the first pivot or second pivot may be an arc spring which is disposed within a recess of the idler pulley bracket. An alternative, non-limiting example of another biasing means may be a torsion spring which is disposed at the first pivot and/or second pivot.

The idler pulley is mounted to a baseplate. The baseplate is pivotally mounted to an idler pulley bracket. Similar to the first pivot, the second pivot may include a force balancing biasing means to urge the baseplate to rotate in a clockwise direction. As shown in FIG. 6, the biasing means for the second pivot may be an arc spring which is disposed within a recess of the idler pulley bracket. An alternative, non-limiting example of another biasing means may be a torsion spring which is disposed at the first pivot and/or second pivot.

The idler pulley bracket is affixed to the cylinder block, the generator, and/or other accessory or engine components. Given that the baseplate is pivotally mounted to the idler pulley bracket, the baseplate may therefore pivot between a first position and a second position. The belt may be easily mounted on the idler pulley when the baseplate and cam are in the second position given that the belt is no longer in tension.

The present disclosure also includes a method for servicing an idler assembly 10. The method includes the steps of pivoting a cam from a first position to a second position and then pivoting a baseplate and an idler pulley from a first position to a second position. While the cam and the baseplate are in their respective second positions, a user may easily remove the belt which is no longer in tension. Furthermore, while the cam and the baseplate are in their respective second positions, a user may install a second belt onto the idler assembly. Once the new or repaired belt is mounted onto the various engine drive, driven, and/or idler pulleys, the pivoting cam may be moved from the second position back to the first position while pivoting the baseplate and the idler pulley from the second position back to the first position. The cam and baseplate may therefore be in an engaged position where they abut each other in the first position and a user may secure a final bolt to the baseplate to complete assembly and to prevent movement of the baseplate 14. It is further understood that the cam and the baseplate may each include an indicator 80, 80' where the marks for the indicators 80, 80' (shown in FIG. 4) line up and a user may determine as to whether the cam and the baseplate are adequately engaged.

The invention and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description of preferred embodiments, and best mode, appended claims, and accompanying drawings in which:

Like reference numerals refer to like parts throughout the description of several views of the drawings.

DETAILED DESCRIPTION OF THE INVENTION

The exemplary embodiments described herein provide detail for illustrative purposes, and are subject to many variations in composition, structure, and design. It should be emphasized, however, that the present disclosure is not limited to a particular tool for handling the belt 22, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and, the terms "a" and "an" herein do not denote a limitation of quantity, but rather denote the presence of at least one of the referenced items.

The present disclosure provides an idler assembly 10 and method which reduces manufacturing costs, assembly 10 time to install, service and/or remove a belt 22. The new idler assembly 10 arrangement addresses the challenges associated with working in the limited packaging space of the idler assembly 10 given the compact nature of the design.

Figure 1:
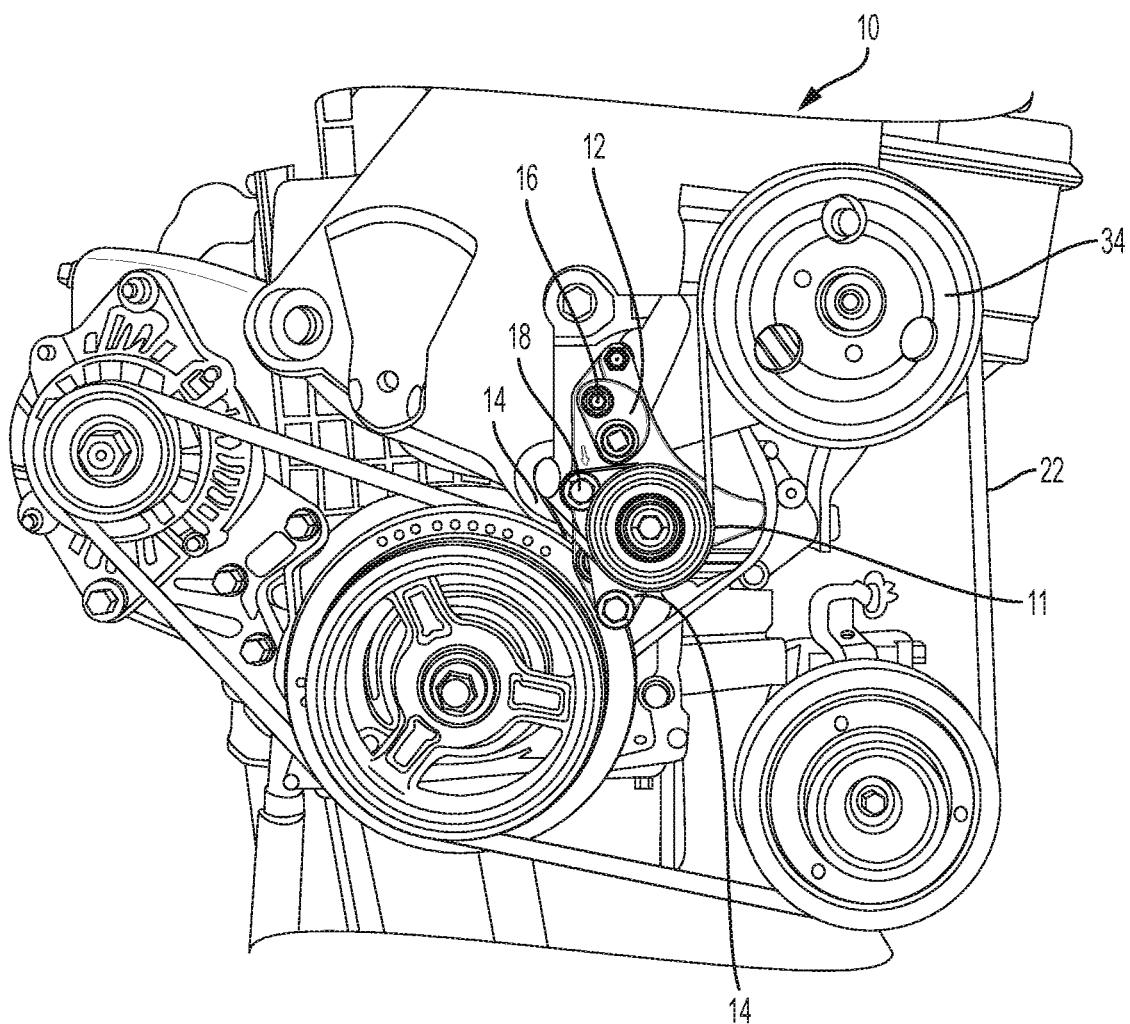
FIG. 1 is a front view of an engine with the engine pulley of the present disclosure.
Figure 2:
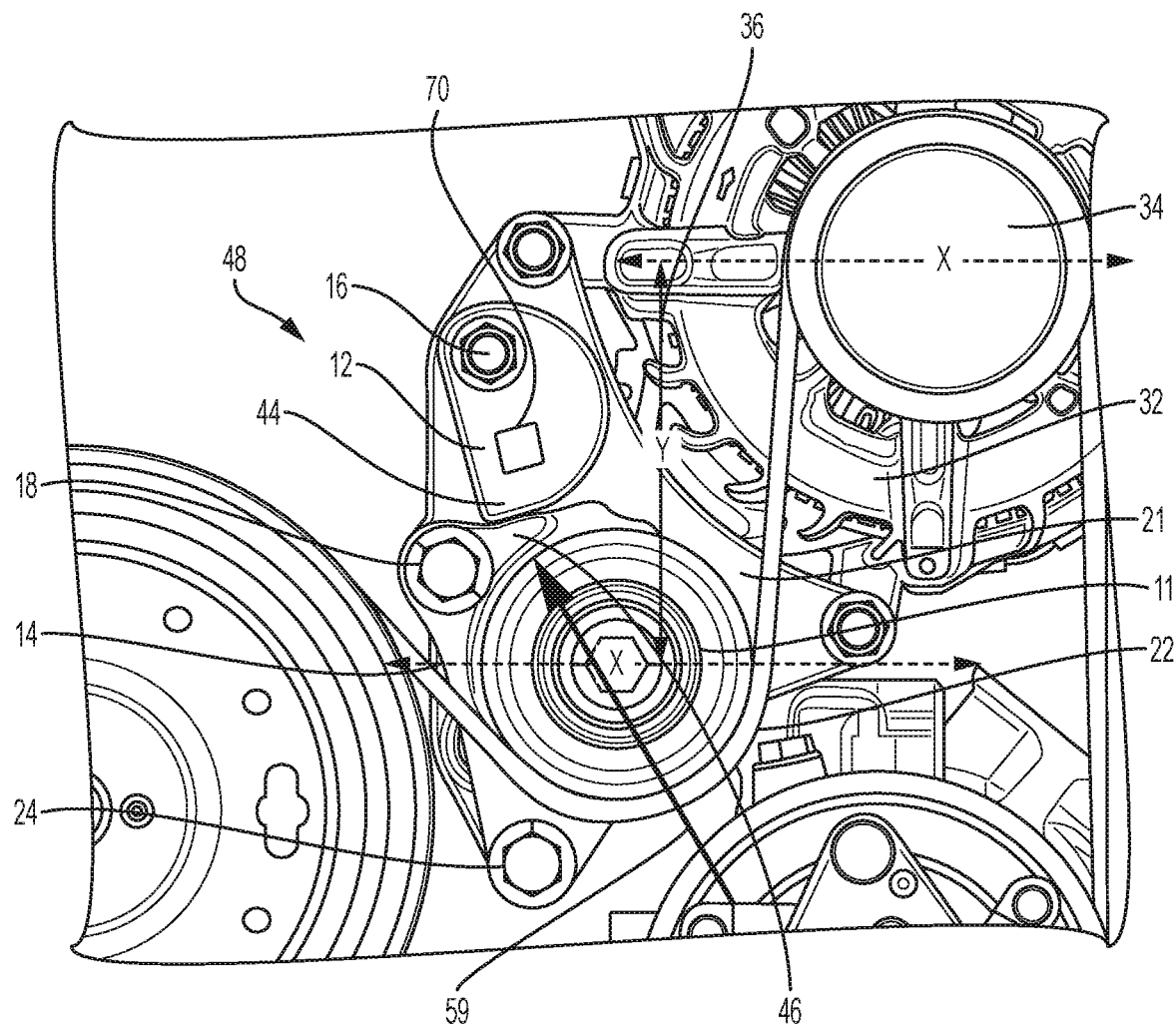
FIG. 2 is a front view of the present disclosure with the engine pulley system in a first position.

With reference to FIG. 2, a front view of the idler assembly 10 is shown in a first position 48 where the belt 22 is shown in the installed position. As shown, the idler assembly 10 uses an idler pulley 11 which is mounted to a pivoting baseplate 14. The idler pulley 11 rotates about an axis which is affixed to the baseplate. The idler pulley 11 is part of a vehicle's belt system that helps regulate how the belts run from the crankshaft (via crankshaft pulley 90 in FIG. 2) to generate movement in other parts such as generator 32 and other engine accessories. Belt 22 rests on the generator pulley 34, idler pulley and the crankshaft pulley among other things. These engine belts are often called "serpentine belts" 22 when they run across various pulleys, and they often run the air conditioning compressor, power steering pump, and alternator of a vehicle.

Figure 3:
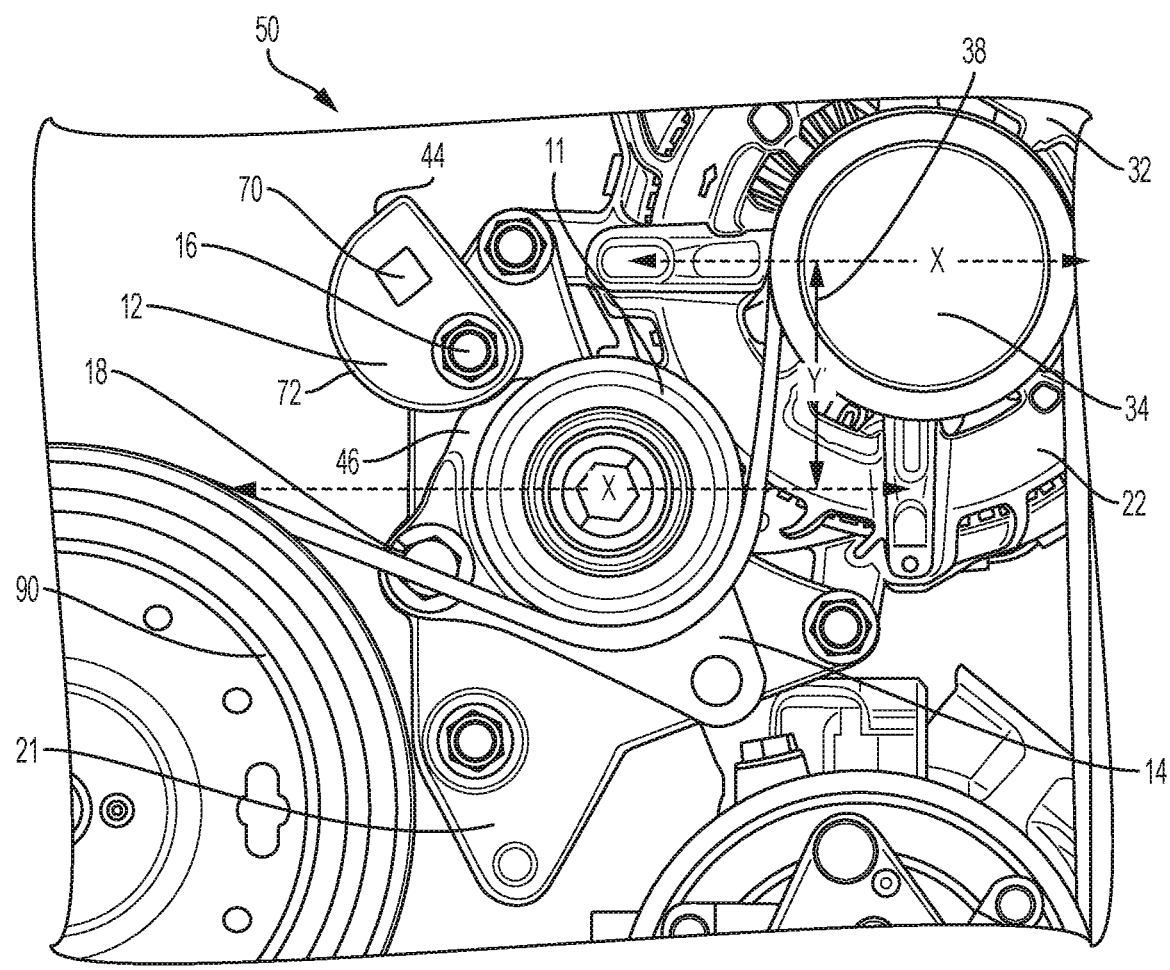
FIG. 3 is a front view of the present disclosure with the engine pulley system in a second position.
Figure 4:
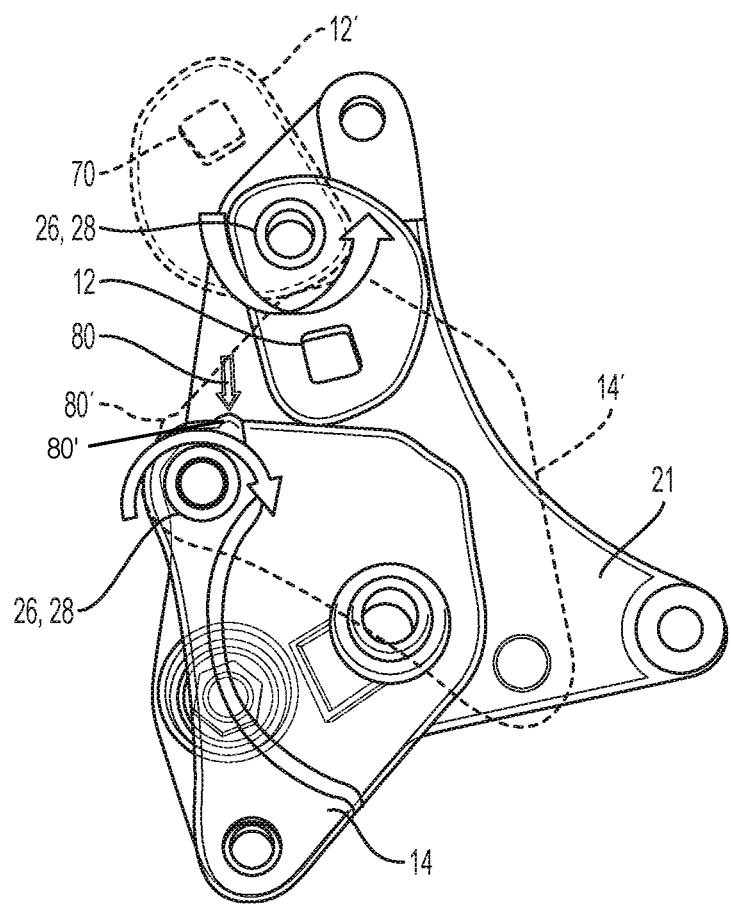
FIG. 4 is a front view of the present disclosure showing the cam and baseplate in both the first position and the second position.

As shown in FIGS. 2 and 3, the idler pulley 11 may be rotated so that it moves between a first position 48 (shown in FIG. 2) to a second position 50 (shown in FIG. 3) to allow for the belt 22 to be installed when the idler pulley is in the second position 50. To move from the first position 48 to the second position 50, the cam 12 is turned out of the way and up via the first pivot 16, thereby allowing idler and the baseplate 14 to also rotate up about the second pivot 18. Similar to the first pivot 16, the second pivot 18 may also include a force balancing biasing means, such as a torsion spring 28, which will urge the second pivot 18 to rotate in a clockwise direction as shown in FIG. 4. When the baseplate 14 is rotated up, there is less tension on the belt 22 thereby making it much easier for a user to remove the belt 22 from the pulley and engine.

Another belt 22 (new or repaired) may be installed when the baseplate 14 and cam 12 are in the second position 50 as shown in FIG. 3 given that the vertical distance changes from Y 36 (see FIG. 2) to Y' 38 (see FIG. 3). The vertical distance of is the vertical distance between the idler pulley 11 and the generator pulley 34 when the belt 22 is in tension. As illustrated, the vertical distance Y between the generator pulley 34 and the idler pulley 11 is decreased when the components are in the second position 50 thereby allowing the belt 22 to have a looser fit around the idler pulley 11 and making it easier to remove/install/service the belt 22. When the idler assembly 10 is in the second position 50, the stretchy belt 22 can be installed without tension. After a new or repaired belt 22 is installed, the cam 12 is rotated against the baseplate 14 so that, the cam 12 moves from the cam's second position 50 back to the first position 48. The baseplate 14 and the idler pulley 11 then rotate about second pivot 18, moving the idler pulley 11 back into the first position 48 where the belt 22 is in tension and installed.

With reference to FIG. 4, the cam 12 may he manually rotated between the first and second positions 48, 50. Cam 12' is in the second position while cam 12 is in the first position. Similarly baseplate 14' is in the second position while baseplate 14 is in the first position. An extension from a tool may fit into a cam aperture 70 or recess in the cam 12 to rotate the cam 12 counter clockwise. The idler pulley 11 and the base plate may rotate down from the first position as baseplate 14' to the second position as baseplate 14 about the second pivot 18 having torsion spring 28 thereby applying tension to the belt 22. The force vector 59 of the belt 22 under tension holds the cam 12 in the engaged position where the first engagement edge 44 of the cam 12 is fully abutted against the second engagement edge 46 of the baseplate 14. Moreover, as indicated, the first and second pivots 16, 18 may each include a force balancing biasing means 26 such as, but not limited to a torsion spring 28 such that the cam 12 is urged against the baseplate 14 via the force balancing biasing means 26 at the first pivot 16, and the baseplate, 14 is urged toward the cam 12 via the force balancing biasing means 26 at the second pivot 18. It is understood that the force balancing means 26 at the second pivot 18 may also react against the pulley hub load. Accordingly, the load from the belt 22 and optionally together with the force balancing biasing means ensures that the baseplate 14 is fully abutting the cam 12. While the components are maintained in the engaged position, a user may secure a final bolt 24 to the baseplate 14 and the idler pulley bracket 21. The final bolt 24 affixes the baseplate 14 to the idler pulley bracket 21 such that the baseplate 14 is in the first position 48 (or engaged position).

Accordingly, as shown, the cam 12 allows the idler pulley 11 and baseplate 14 to rotate about the second pivot 18 in a compact swing radius down into the installed position given that the outer edge 72 of the cam 1.2 slides along the second engagement edge 46 of the baseplate 14 thereby causing the baseplate 14 to rotate downward in a clockwise manner. As shown in FIGS. 2 and 3, the cam 12 defines a first engagement edge 44 while the baseplate 14 defines a second engagement edge 46. When the cam 12 is fully rotated to engage with the baseplate 14 to apply tension to the belt 22 in the second position 50, the first engagement edge 44 of the cam 12 abuts the second engagement edge 46 of the baseplate 14. Again, the vector force 59 applied to the baseplate 14 due to the belt 22 being in tension allows these rotating components to remain engaged and stationary so that a worker does not need to hold the components in place while securing the final bolt 24.

Figure 5:
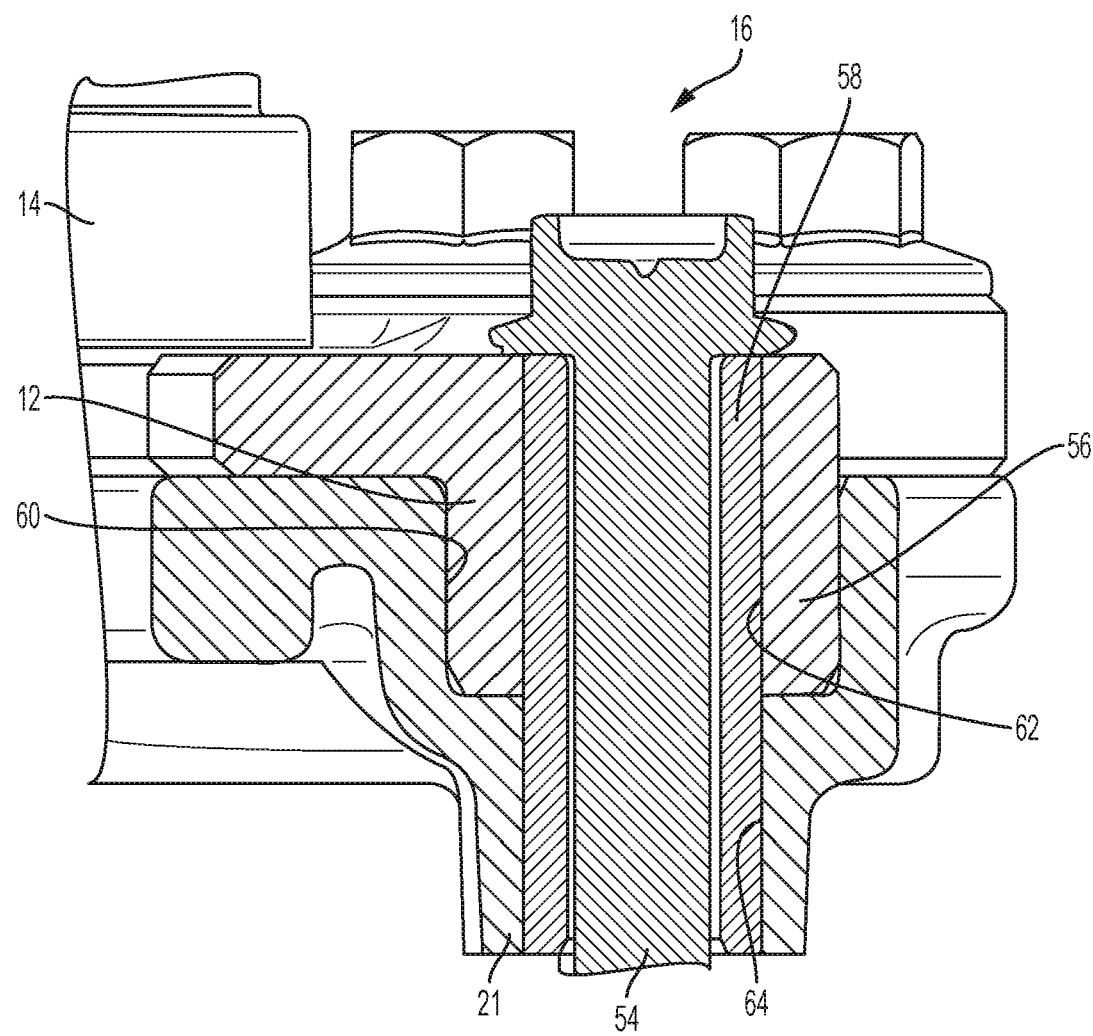
FIG. 5 is a cross sectional view of first pivot showing the cam feature in the idler pulley bracket.
Figure 6:
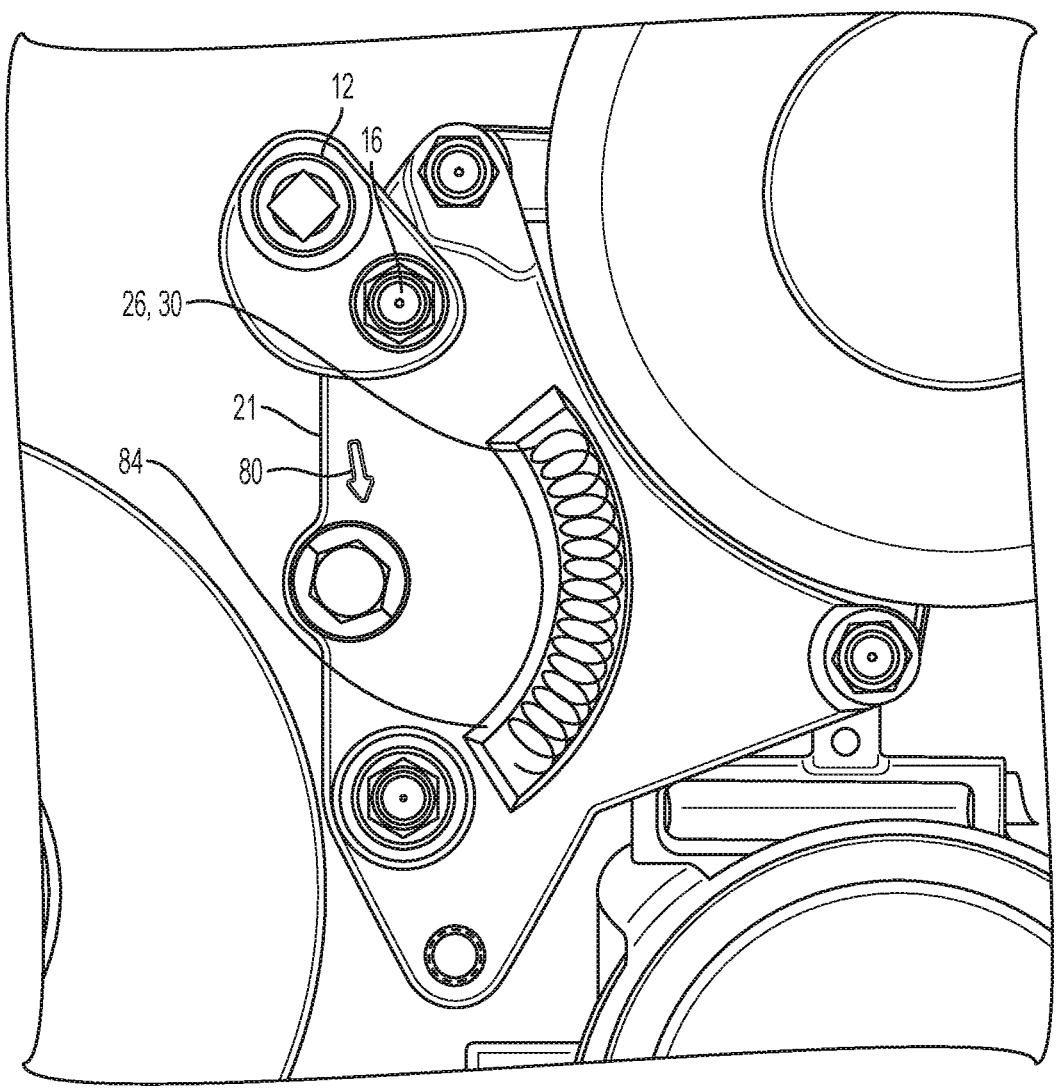
FIG. 6 is a front view of a recess in the baseplate bracket along with the arc spring for the recess.

With reference to FIG. 5, the cam 12 may be designed such that a portion of the cam 12 is in the form of a protrusion 56 which fits within an opening 64 of the idler pulley bracket 21. The pivot pin 54 may be disposed within a cam bore 62 defined in the cam protrusion 56. As shown in FIG. 5, a sleeve 58 may be disposed between pivot pin 54 and the cam 12/idler pulley bracket 21.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An idler assembly comprising:
a cam pivotally mounted to an idler pulley bracket, the cam being pivotally moveable between a first position and a second position via a first pivot;
an idler pulley mounted to a baseplate and the baseplate being pivotally mounted to the idler pulley bracket, the baseplate being pivotally moveable between a first position and a second position via a second pivot; and
a belt operatively configured to engage with the idler pulley and a plurality of engine pulleys, wherein the cam defines a first engagement edge, the baseplate defines a second engagement edge operatively configured to engage with the first engagement edge of the cam, and at least one of the first pivot and the second pivot include a force balancing biasing means.

2. The idler assembly of claim 1 wherein the baseplate defines a mounting aperture operatively configured to receive a final bolt.

3. The idler assembly of claim 1 wherein the cam defines one of a receiving aperture or a recess configured to engage with an installment tool.

4. The idler assembly of claim 1 further comprising a final bolt operatively configured to couple the baseplate to the idler pulley bracket.

5. The idler assembly of claim 1 wherein the biasing means is a torsion spring.

* * * * *